United States Patent
Jammes et al.

(10) Patent No.: US 7,124,029 B2
(45) Date of Patent: Oct. 17, 2006

(54) METHOD FOR EVALUATING FORMATION PROPERTIES

(75) Inventors: Laurent Jammes, Beijing (CN); Ollivier Faivre, Paris (FR); Emmanuel Legendre, Sèvres (FR); Pascal Rothnemer, Clamart Cedex (FR); Jean-Claude Trouiller, Saint Remy les Chevreuse (FR); Maria Teresa Galli, Milan (IT); Mauro Gonfalini, Milan (IT); Patrizio Gossenberg, Milan (IT)

(73) Assignee: Schlumberger Technology Corporation, Sugar Land, TX (US)

( * ) Notice: Subject to any disclaimer, the term of this patent is extended or adjusted under 35 U.S.C. 154(b) by 100 days.

(21) Appl. No.: 10/381,833

(22) PCT Filed: Sep. 28, 2001

(86) PCT No.: PCT/EP01/11286

§ 371 (c)(1),
(2), (4) Date: Nov. 15, 2004

(87) PCT Pub. No.: WO02/29444

PCT Pub. Date: Apr. 11, 2002

(65) Prior Publication Data

US 2005/0165553 A1    Jul. 28, 2005

(30) Foreign Application Priority Data

Sep. 28, 2000    (FR) ................... 00 12528

(51) Int. Cl.
*G01V 3/18* (2006.01)
(52) U.S. Cl. .......................... 702/7; 702/10
(58) Field of Classification Search ............. 702/6–11; 703/10
See application file for complete search history.

(56) References Cited

U.S. PATENT DOCUMENTS

| | | | | |
|---|---|---|---|---|
| 4,340,934 A | * | 7/1982 | Segesman | 702/11 |
| 4,482,959 A | * | 11/1984 | Minne | 702/7 |
| 4,486,836 A | * | 12/1984 | Lacour-Gayet | 702/7 |
| 5,675,147 A | * | 10/1997 | Ekstrom et al. | 250/256 |
| 5,867,806 A | * | 2/1999 | Strickland et al. | 702/7 |
| 6,098,019 A | * | 8/2000 | Hakvoort et al. | 702/7 |

* cited by examiner

*Primary Examiner*—Donald McElheny, Jr.
(74) *Attorney, Agent, or Firm*—Victor H. Segura; Brigitte L. Echols

(57) ABSTRACT

Methods for evaluating the properties of formations surrounding a borehole, include the steps of measuring electrical properties of the formation from within the borehole; deriving a model of parameters of the formation surrounding the borehole; and estimating the properties of the formation using the model to interpret the measured electrical properties. In one aspect of the invention in which the formation includes a series of distributed beds, each bed having specific properties. Another aspect includes grouping similar beds, assigning one or more properties to all of the beds in a group, and using the assigned properties to estimate the properties of the formation for measurements relating to the beds of that group. Another aspect includes making several different measurements of formation electrical properties and simultaneously estimating the formation properties from the different measurements to provide a joint inversion. A still further aspect includes the use of a complex model incorporating electrical properties with other petrophysical information to estimate the properties of the formation from the electrical measurements.

9 Claims, 6 Drawing Sheets

METHOD FOR EVALUATING FORMATION PROPERTIES

The present invention relates to methods for evaluating underground formation properties, in particular for evaluating the properties of an underground formation surrounding a borehole using measurements of electrical properties of the formation from within the borehole.

In formation evaluation, deep resistivity tool measurements are commonly used to provide an estimation of the virgin zone resistivity $R_t$, which is strongly dependent on the hydrocarbon content of the rock. Oil saturation is linked to virgin zone resistivity, porosity and other formation parameters through different saturation equations: Archie, Waxman-Smits. However, current deep resistivity measurements have limited vertical resolution and are sensitive to important parasitic effects. Significant corrections have to be applied prior to estimating a usable value of $R_t$, e.g. borehole effects, adjacent-bed (shoulder) effects and step-profile invasion corrections. These corrections are generally assumed independently and applied in sequence, a valid assumption when the bed thickness is relatively large.

The assumption that these effects are independent may not be valid in certain conditions, preventing an accurate estimation of reserves. For example, in thin beds, the depth of investigation of laterolog deep and shallow measurements becomes similar. Without differentiation between the measurements, standard invasion correction is no longer possible. In case of high resistivity contrast between neighbouring beds, the Born approximation used in processing measurements from induction tools such as the Array Induction Tool (AIT) of Schlumberger is no longer valid, possibly causing spurious curve separation and inappropriate invasion correction. Recently developed focusing (Barber, T. et al.: "Optimal Evaluation of Formation Resistivities Using Array Induction and Array Laterolog Tools" 2000 SPWLA Annual Logging Symposium, Dallas, Jun. 4–7, 2000) will reduce these artifacts on field logs, while maximum-entropy inversion of array induction logs (Barber, T. D. et al.: "Interpretation of Multiarray Induction Logs in Invaded Formations at High Relative Dip Angles", paper A presented at the 1998 SPWLA Annual Logging Symposium, Keystone, May 26–29) allows removal of these artifacts on legacy array induction data.

These drawbacks can be overcome by simultaneously taking into account borehole, shoulder and invasion effects through a forward-model based inversion technique. This processing scheme consists of two steps:
 building a geometrical model of the formation, as a sequence of beds, invaded or not.
 simulating the tool response for this pre-defined formation model by using a forward modeling code, comparing the predicted measurements and the actual tool measurements, and updating the formation parameters until a good match is obtained between the two.

The application of inversion techniques to resistivity logging has been already proposed by Mezzatesta et al (Mezzatesta, A. G., Eckard, M. H. and Strack, K.-M.: "Integrated Interpretation of Galvanic and Induction Measurements by Inversion Methods", paper E presented at the 1995 SPWLA Annual Logging Symposium, Paris, Jun. 26–29). This proposes that a simultaneous 2D inversion of galvanic and induction data could significantly improve the estimation of the virgin zone resistivity. A later paper (Frenkel, M. A. and Mezzatesta, A. G.: "Minimum and maximum pay estimation using resistivity log data inversion", paper Z presented at the 1998 Annual Logging Symposium, Keystone, May 26–29) discusses quality-control aspects (such as measurement sensitivities to formation properties estimation of uncertainties and minimum and maximum bounds). With the development of robust minimization algorithms and the availability of fast forward-modeling codes, inversion techniques have become a usable tool for the interpreter.

Thin-bed analysis has been among the first applications (Warrilow, I. M. et al.: "Application of Resistivity Inversion Software To Thin-Bed Evaluation", presented at the SPE Asia Pacific Oil & Gas Conference, Kuala Lumpur, 1995). In such environments, the sensitivity to $R_t$ of deep-resistivity tools degrades drastically and hydrocarbon-bearing beds are often by-passed. Several authors have shown that the layering of the formation can be introduced as a priori geometrical information in the inversion scheme to stabilize the ill-posed "resolution enhancement" problem.

More recently, a fast and automatic inversion scheme has been made available to analyze measurements provided by a new array laterolog (Griffiths, R. et al.: "Better Saturation from New Array Laterolog", 1999 SPWLA Annual Logging Symposium, Oslo, June 1–4).

This application requires little expertise and can be used for routine analysis. The service now couples more recent hardware technology such as the High Resolution Laterolog Array tool (HRLA) of Schlumberger and modern processing techniques which bring significant improvement in reserves delineation.

The present invention seeks to provide improved methods for interpreting electrical log data that allow some or all of the problems identified above to be handled and to provide a more reliable determination of $R_t$ to aid in evaluation of formation properties.

Methods according to the invention comprise:
 (i) measuring electrical properties of the formation from within the borehole;
 (ii) deriving a model of parameters of the formation surrounding the borehole; and
 (iii) estimating the properties of the formation using the model to interpret the measured electrical properties.

One aspect of the invention comprises such a method in which the formation includes a series of distributed beds, each bed having specific properties, the method comprising estimating the positions of the beds, preferably the position of the bed boundaries, simulating measurements of the electrical properties using the estimated bed positions and comparing the simulated measurements to the measured electrical properties, and using the comparison to optimise the bed positions and estimate the formation properties from the measured electrical properties.

This aspect further comprises:
 (a) determining the variation of the measured electrical properties across the series of beds;
 (b) analysing the measured properties to obtain a first estimate of the position of each bed in the series;
 (c) simulating the variation of the measured electrical properties across the series using the model, the specific bed properties and the first estimated positions of the beds;
 (d) comparing the simulated variation of electrical properties with the determined variation of measured electrical properties;
 (e) using the comparison to adapt the estimate of the position of the beds such that the estimated variation and the determined variation are substantially the same; and (f) using the adapted estimate of the bed positions in the estimation of the formation properties.

Another aspect of the invention comprises grouping similar beds, assigning one or more properties to all of the beds in a group, and using the assigned properties to estimate the properties of the formation for measurements relating to the beds of that group.

This aspect further comprises:
(a) identifying sequences of beds that are below the resolution of the electrical measurement;
(b) assigning one or more properties to the beds in those sequences; and
(c) using the assigned properties to estimate the properties of the formation including those sequences.

Another aspect of the invention comprises making several different measurements of formation electrical properties and simultaneously estimating the formation properties from the different measurements to provide a joint inversion.

This further aspect comprises:
(a) obtaining several measurements of electrical properties of a formation of interest, each measurement being of a different nature;
(b) simultaneously estimating the formation properties using the model and the different measurements of electrical properties.

A still further aspect of the invention comprises the use of a complex model incorporating electrical properties with other petrophysical information to estimate the properties of the formation from the electrical measurements.

The present invention will now be described by way of examples, with reference to the accompanying drawings, in which.

Methods according to the invention are based on the log-simulation capability for a wide range of wireline and logging-while-drilling (LWD) tools. The 2D log simulators for the wireline array and dual induction tools and 2-MHz LWD resistivity tools all use a semianalytic mode-matching method developed by Liu and Chew in the mid 1980s (Chew, W.: "Waves and Fields in Inhomogeneous Media", Van Nostrand Reinhold, N.Y., 1990). For wireline induction tools, the log-simulation outputs are the raw and skin-effect corrected apparent resistivities for each log station. Different post-processing options, which provide vertical-resolution enhancement and/or resolution-matching, are available to the user to simulate exactly the data acquired and post-processed by the acquisition platform (Barber, T. D.: "Phasor Processing of Induction Logs Including Shoulder and Skin Effect Correction", U.S. Pat. No. 4,513,376, 1984; Barber, T. D., and Rosthal, R.:"Using a Multiarray Induction Tool to Achieve Logs with Minimum Environmental Effects", paper SPE 22725, presented at the 1991 SPE Annual Technical Conference and Exhibition, Dallas).

Compensated LWD resistivity tools are available in different sizes, some with different transmitter-receiver spacings. The log simulators compute the raw, complex-valued voltages for each transmitter-receiver combination and condense them into attenuation and phase shifts between the receivers. These raw data are converted to apparent resistivities by post-processing.

The numerical code used for laterologs is specifically designed for simulate logs of tools made of long electrodes carrying galvanic currents in axisymmetric formations. The numerical scheme used is a finite-element method.

Methods according to the invention follow the inversion-processing methodology below:

1. Depth1-interval selection: A zone of interest is first selected, where the traditional sequence of 1D processing does not give a sufficiently accurate answer (borehole, shoulder and invasion effects cannot be separated).

2. Formation model creation: The formation is represented as a sequence of parallel beds, according to the geometrical model. An invasion model (such as step, ramp, annulus. . . ) is assigned to each bed, together with a specific set of physical/petrophysical properties necessary to describe it.

3. Formation properties estimation: The optimization (inversion) routine is run to estimate user-selected parameters (any sub-set of the formation properties can be fixed).

The formation model is defined as a sequence of parallel layers. The first step consists of estimating bed-boundary positions. This detection is performed by a segmentation algorithm, which identifies and positions boundaries on a selected set of logs. A simple logic can be used to distinguish between invaded and noninvaded beds, based on a user-defined invasion flag, triggered from any log. The output of this task is a formation model described by a limited set of parameters.

Figure 1:
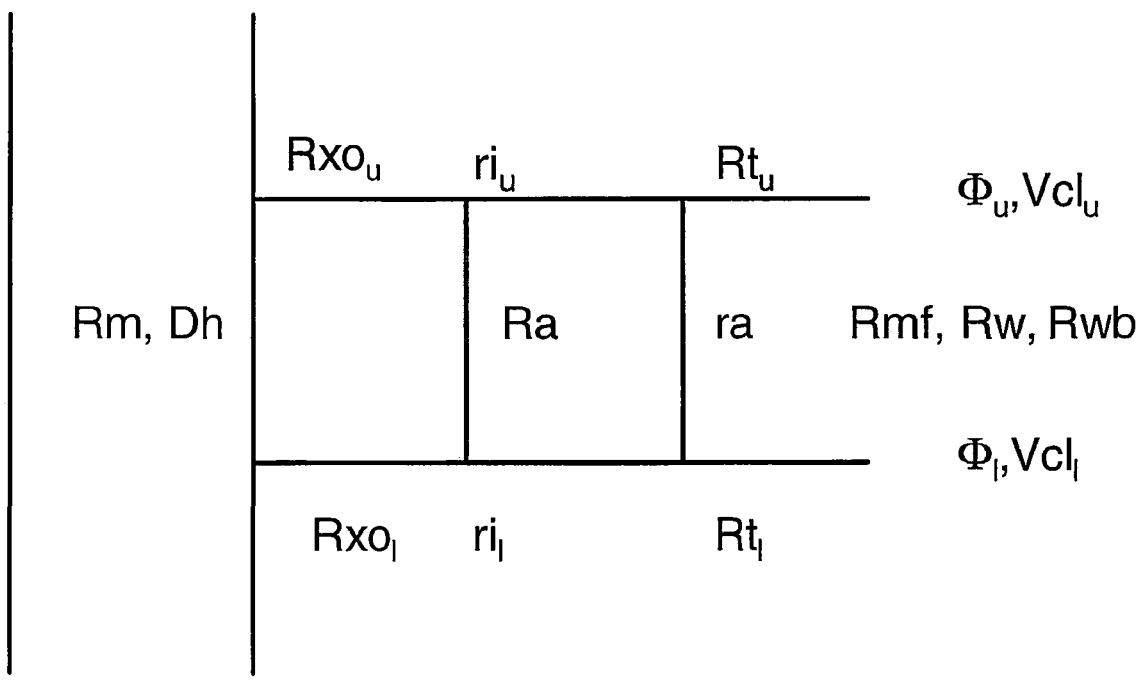
FIG. 1 shows a schematic bed description of a type useful in methods according to the invention.

The second step consists of refining the bed description, if needed. For specific beds, the user can select from a range of complex invasion profiles (radial resistivity ramp, annulus, invasion vertical ramp) or default to a simple step profile. It is also possible to link resistivities and petrophysical properties together, through a saturation equation with preset parameters. One complete set of properties (geometrical and physical) needed to describe a bed model in the most general case is given in FIG. 1, in which:

$D_h$=Hole Diameter, L
$r_a$=Annulus Zone Radius, L
$r_i$=Invasion Radius, L
$R_a$=Annulus Zone Resistivity, ohm.m
$R_m$=Mud Resistivity, ohm.m
$R_{mf}$=Mud Filtrate Resistivity, ohm.m
$R_t$=Virgin Zone Resistivity, ohm.m
$R_w$=Formation Water Resistivity, ohm.m
$R_{wb}$=Bound Water Resistivity, ohm.m
$R_{we}$=Equivalent Formation Water Resistivity, ohm.m
$R_{xo}$=Invaded Zone Resistivity, ohm.m
$S_{xo(t)}$=Invaded Zone (Total) Water Saturation (%)
$S_{w(t)}$=Virgin Zone (Total) Water Saturation (%)
$V_{cl}$=Shale Volume (%)
$\Phi_{(t)}$=(Total) Porosity (%)

The description includes both geometrical (radii, bed boundaries) and physical/petrophysical parameters (such as resistivities, porosity, and shale volume), u stands for upper, l stands for lower.

For each bed, the set of parameters to be estimated can be selected from among those used in the description. The estimation of the selected parameters is performed by minimizing a cost function (or penalty function) C(p), defined as the weighted squared difference between selected measurements and corresponding modeled logs:

$$C(p) = \sum_i a_i \frac{\|M_i - f_i(p)\|^2}{\sigma_i^2} \quad (1)$$

where p is the parameter vector (unknowns), $M_i$ is a measurement channel and $f_i$ the corresponding theoretical tool response computed by a forward model; $\sigma_i$ is the estimation of the confidence on measurement $M_i$, and $\alpha_i$ a user-selected weight. In the first version of the product, $\sigma_i$ is assumed to be a fraction of the signal level, identical for each of the measurements.

Figure 2:
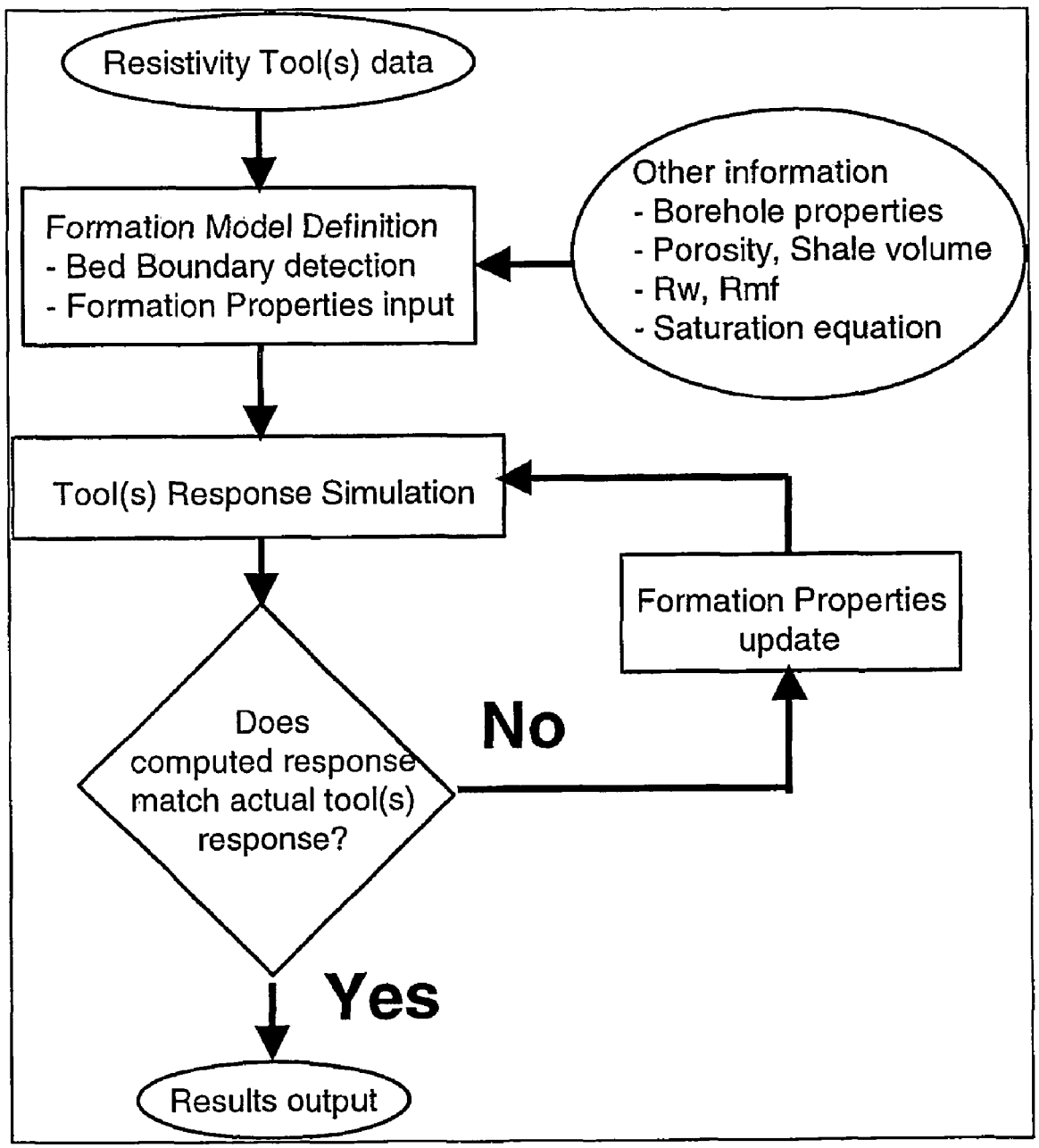
FIG. 2 shows a processing flow-chart applicable to methods according to the invention.

The inversion is an iterative process, which starts with an initial guess of the formation model. A forward model then computes the theoretical response of each tool to this formation model and compares it with the actual measurements. If a significant mismatch occurs between the two (high cost function), the formation property values are refined to reduce the difference, until the match becomes acceptable with respect to specific convergence criteria (see FIG. 2). The minimization is performed using a version of the Levenberg-Marquardt algorithm (other minimization algorithms may be used). It is also possible to use a priori information in the parameter estimation.

The principle processing quality control indicator is the value of the cost function, together with the individual log reconstruction errors:

$$Rec_i = 100 * \frac{(M_i - f_i(p))}{f_i(p)} \quad (2)$$

Methods according to the invention allow four different functionalities for accurate formation description and parameter estimation:

The optimization of bed-boundary positions.

The possibility to link together parameters to be determined.

The joint analysis of different resistivity tools measurements.

A link between resistivity variations and petrophysical parameters using a saturation equation (complex models).

For clarity, these specific features will be described below separately, but can be used jointly.

The user has the possibility to optimize the bed-boundary positions, which are considered as bed-model parameters. A positivity constraint is set on the bed thickness, to ensure that the boundary positions do not crossover during the optimization process.

Figure 3:
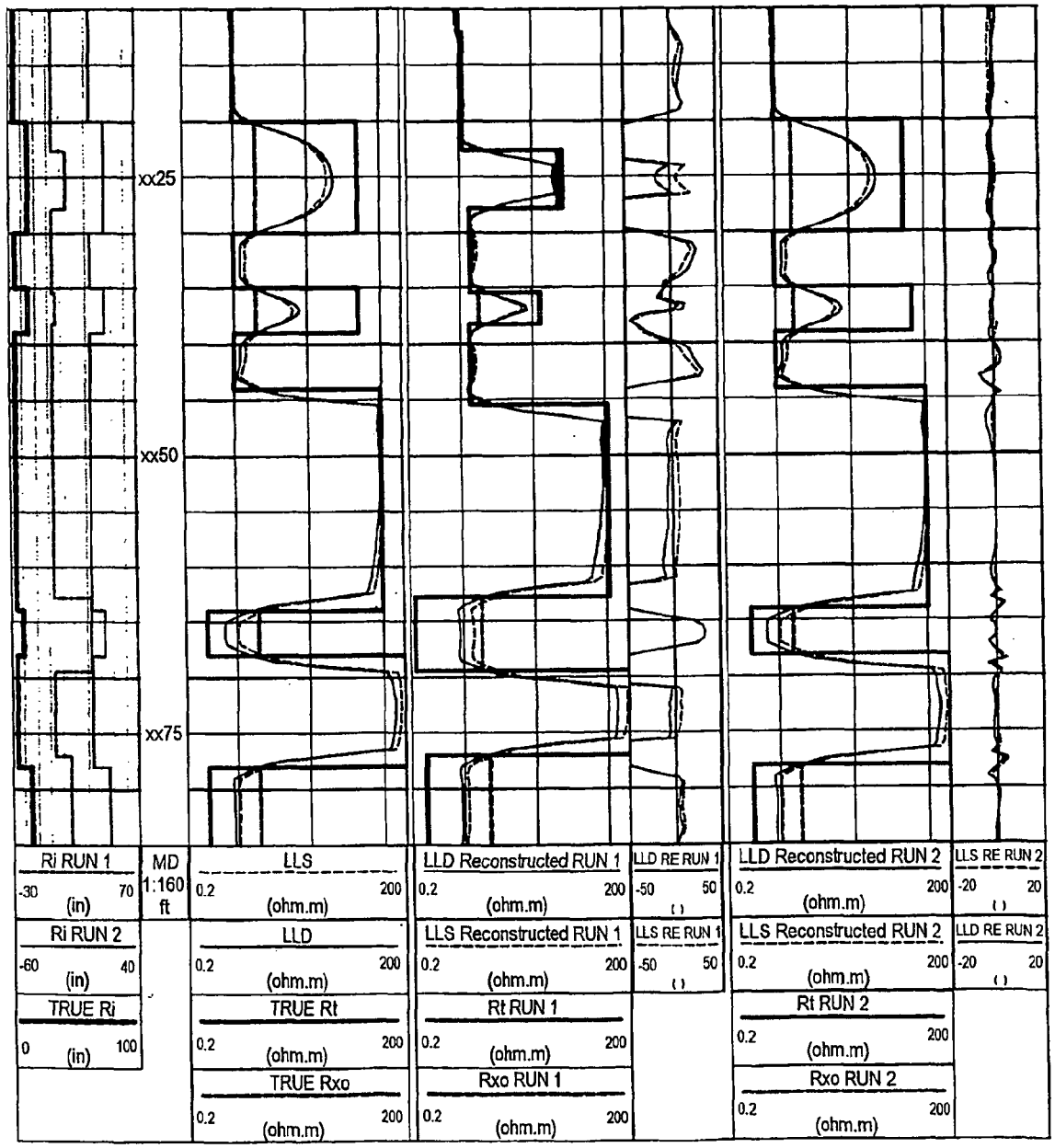
FIG. 3 shows log plots demonstrating optimisation of bed boundaries.

FIG. 3 shows a synthetic example where the estimation of $R_t$ from a Dual Laterolog Tool benefits from a reoptimization of the bed boundary locations. The synthetic resistivity profiles are plotted in the left logarithmic track, together with a simulated dual laterolog tool response ($R_m$=0.2 ohm.m, $D_h$=8.5"). Inaccurate bed boundary positions translate into inaccurate $R_t$, $R_{xo}$ and $r_i$ estimations, together with poor reconstruction errors (middle logarithmic track). When bed-boundary positions and formation properties are jointly optimized, the inversion converges back to the original model (right logarithmic track).

The true resistivity profiles ($R_t$, $R_{xo}$) are plotted in the left logarithmic track. In the first run, the values of $R_{xo}$, $R_t$ and $r_i$ are estimated using a poor initial guess of the bed-boundary positions. The bed boundary positions are estimated in the normal way, for example by determining the inflection points of the LLS or LLD logs. Since the inflection points can be affected by a number of parameters, not just the position of the bed boundary, estimating the position of the boundary in this way can lead to large errors. The very large errors in the positioning of bed-boundaries results in large reconstruction errors in the corresponding areas, which propagates into poor $R_t$, $R_{xo}$, $r_i$ estimations in invaded beds (middle logarithmic track RUN 1). In the second run, bed boundary positions are optimized by comparison of the model profile and the reconstruction and the bed boundary position and model parameters are adjusted to minimise the difference. The further processing leads to accurate $R_t$, $R_{xo}$, $r_i$ estimations, in both squeeze and anti-squeeze conditions (right logarithmic track RUN 2). Another way to overcome the problem of poor bed boundary detection would be to over-segment the log up to the vertical resolution of the tool. This strategy has been preferred for the High-Resolution Laterolog Array (HRLA) automatic inversion scheme (Griffiths, R. et al.: "Better Saturation from New Array Laterolog", 1999 SPWLA Annual Logging Symposium, Oslo, June 1–4).

Figure 4:
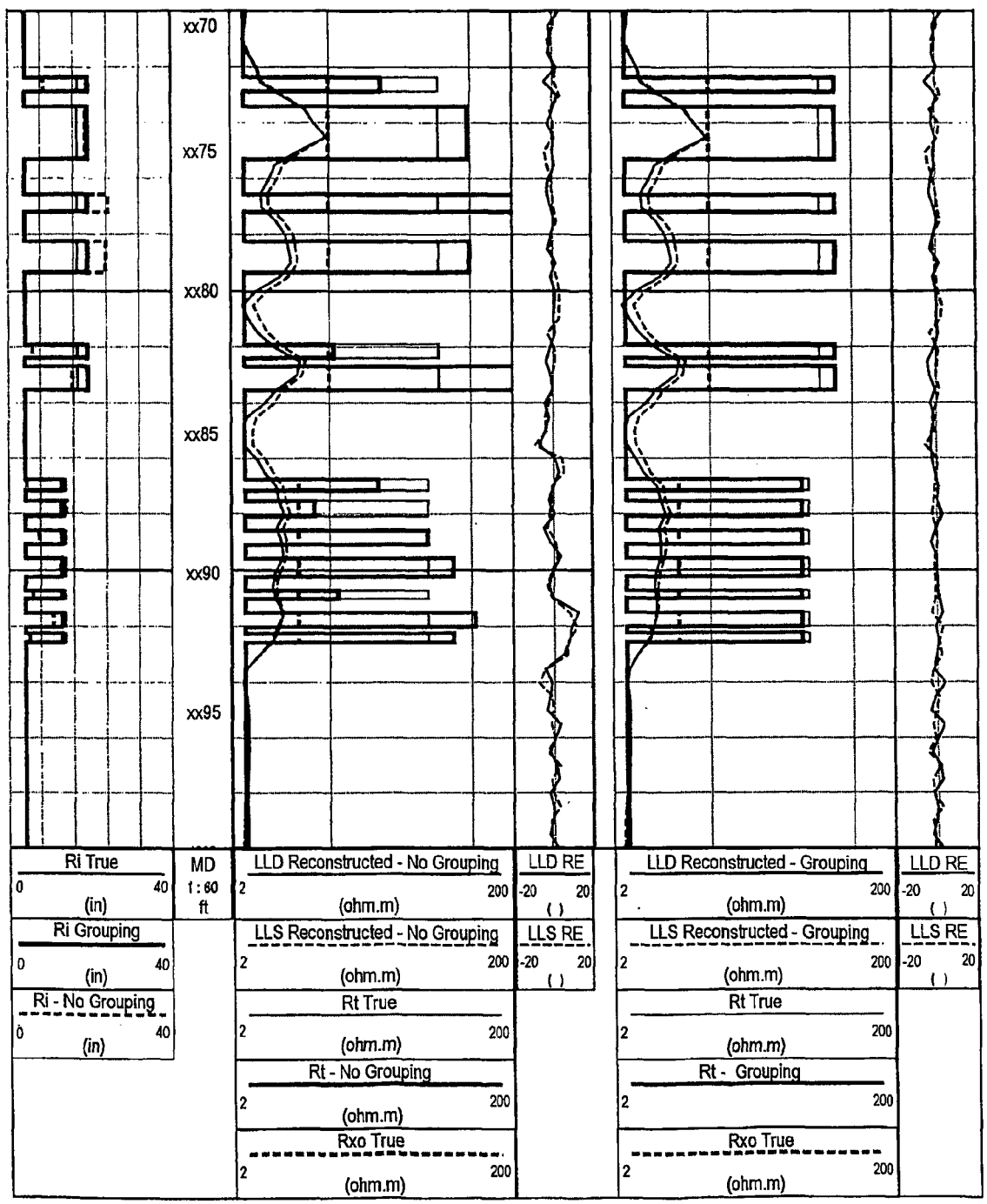
FIG. 4 shows log plots demonstrating parameter grouping.

Methods according to the invention also provide the possibility to link together unknown formation parameters in an action called "parameter grouping". One particular application is in thinly laminated sand-shale formations, where the tool resolution does not permit independent analysis of each bed: the user can assume that $R_t$ is the same in each sand bed. The inversion will check the compatibility of resistivity data with this assumption. The second synthetic case illustrates this capability (FIG. 4). In this example, noisy synthetic data have been generated, corresponding to a Dual Laterolog response in thin-bed sequences ($R_m$=0.7 ohm.m, $D_h$=8.5"). The bed boundaries have been defined by analysis of a high-resolution Rxo measurement. Stability of the results is greatly improved by assuming that $R_t$ is the same within each sequence.

The laterolog response in a thin-bed formation is simulated and a Gaussian noise of 2% is added to both shallow and deep measurements. The sequence of invaded/noninvaded beds has been determined a priori, with an accurate positioning of bed-boundaries and a known value of $R_{xo}$ (from a microresistivity tool response for instance).

The upper section is made of several beds of various thicknesses, poorly resolved by the tool when each of their properties is determined independently. As a consequence of the limited sensitivity of the measurements to $R_t$ (laterolog measurements become shallow in thin-bed conditions, because of high shoulder-bed effect), the noise is amplified and leads to large errors in $R_t$ and $r_i$ (left logarithmic track No Grouping). Using the assumption that the different bed properties, i.e. $R_t$ and $r_i$ are equal across the invaded beds, the processing converges back to the original model (right logarithmic track Grouping). Once again, in the analysis of a real dataset, good log reconstruction would not validate such a "grouping" assumption but would simply indicate its compatibility with the input data. The formation model chosen for the analysis has to be determined and validated prior to the inversion (such as, by a petrophysical analysis using a set of high-resolution sensor measurements).

The lower section is made of beds much thinner than the vertical resolution of the tool. As a result the measurements indicate a uniform formation. In this case, the prior information on bed boundary positions is crucial for the analysis, and the inversion can be seen as a resolution enhancement process.

The invention allows simultaneous processing of the measurements from different tools recorded in the same borehole. This feature has two complementary advantages:

The possibility to automatically exploit the measurement complementarity to improve formation property estimation.

To determine a model of the formation consistent with all the measurements analyzed.

The benefits of simultaneously analyzing galvanic (laterolog) and induction tools has already been proposed. Using the concept of resolution and statistical analysis, the size of the ellipsoid of uncertainties can be significantly reduced in a joint analysis of different tool measurements, for some specific cases. It is known that laterolog measurements are generally more sensitive to the properties of an oil-bearing bed (where $R_{xo} < R_t$), while induction measurements are the best to identify the water zone properties (if $R_{mf} > R_w$). Although less critical with the extension of the operating range of new logging tools, this complementarity helps to improve formation resistivity estimation.

The second advantage of a joint analysis of different tool types resides in the improved description of the formation that can be obtained. Resistivity anisotropy for instance, cannot be determined from laterolog or induction tools alone, but requires a comparison of the two responses.

Figure 5:
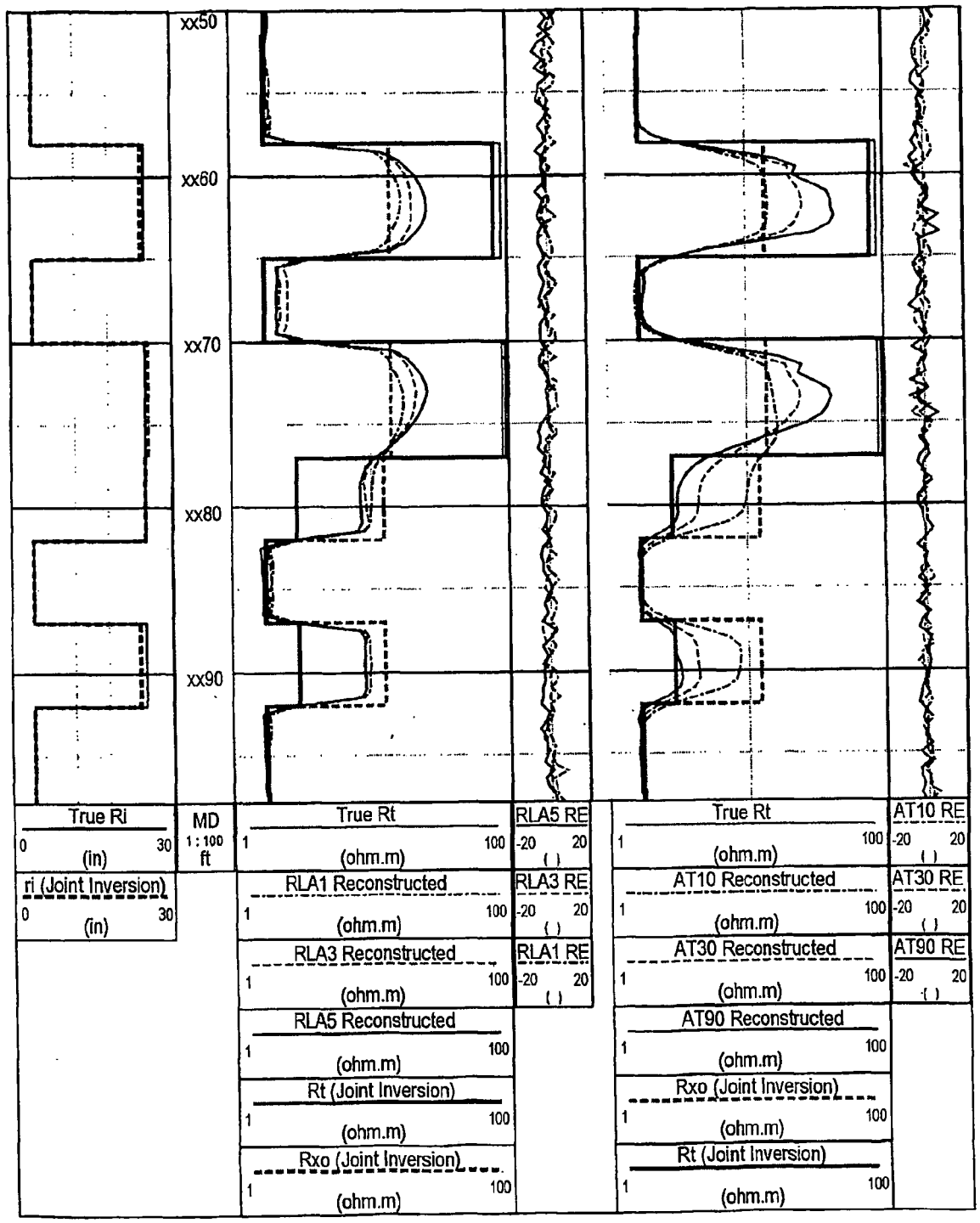
FIG. 5 shows log plots of joint inversion.

Complementarity will be automatically exploited in a multitool inversion, providing that depth-matching is performed before inversion. FIG. 5 shows the results of a 2D joint inversion of noisy synthetic laterolog and induction data, for a formation model representing an oil/water contact and two single beds (oil-bearing bed above and water-bearing below, $R_m=0.5$ ohm.m, $D_h=8.5$", reconstructed measurements are plotted together with the estimation of $R_t$, $R_{xo}$ and $r_t$.). The measurements were perturbed by noise with two components: a zero-mean gaussian noise proportional to the signal (2%) on each measurement and an additive bias from 2% of the signal (deepest channels) to 5% (shallowest channels).

Two single-tool inversions are made, with laterolog and induction data, followed by a joint inversion of the tools. In each case, all bed properties are estimates, including the bed boundary positions. The error on $S_w$ estimation in the oil zone is at a minimum in the case of a joint analysis of laterolog and induction data. Results are summarized in the table below:

|  | True $S_w$ (%) | HRLA $S_w$ (%) | AIT $S_w$ (%) | HRLA + AIT $S_w$ (%) |
|---|---|---|---|---|
| Bed 1: Oil | 0.18 | 0.16 | 0.20 | 0.195 |
| Bed 2: Oil | 0.18 | 0.165 | 0.19 | 0.175 |
| Bed 2: Water | 1.0 | 0.98 | 1.0 | 1.0 |
| Bed 3: Water | 1.0 | 0.82 | 1.0 | 1.0 |

The properties of the bed with an oil/water contact are generally better resolved than those of the homogeneous beds (Beds 1 and 3), whatever tool is analyzed. In the case of the laterolog, the resistive section of Bed 2 deflects the current flow towards the water zone. Without noise, the inversion performed with any combination of tool(s) converges to the exact solution.

The methods of the invention allow use petrophysical information to better describe vertical resistivity variations and thus reduce the number of unknown parameters. The formation is generally represented as a sequence of parallel beds, resulting in a squared estimation of the virgin zone resistivity. This representation is clearly not adequate in transition zones such as sand/silt/shale sequences in turbidite environments or with grain-size changes.

The invention allows modeling of vertical variations of properties such as shale volume $V_{cl}$, or total porosity $\Phi_t$, to account for smooth resistivity changes within a bed. In this case the vertical resistivity profile is predicted using Archie's saturation equation.

$$R_t(z) = \frac{1}{(\phi_t^2 * S_{wt}^2)} R_{we} \qquad (3)$$

where $S_{wt}$ and $R_{we}$ are functions of $V_{cl}$. One can assume a linear vertical variation for $\Phi_t$ or $V_{cl}$, which will result in a depth-dependence of $R_t$. Depending on the assumptions, the inversion algorithm will directly determine water saturation's [$S_{w(t)}$ and $S_{xo(t)}$], always assumed constant within a bed.

Figure 6:
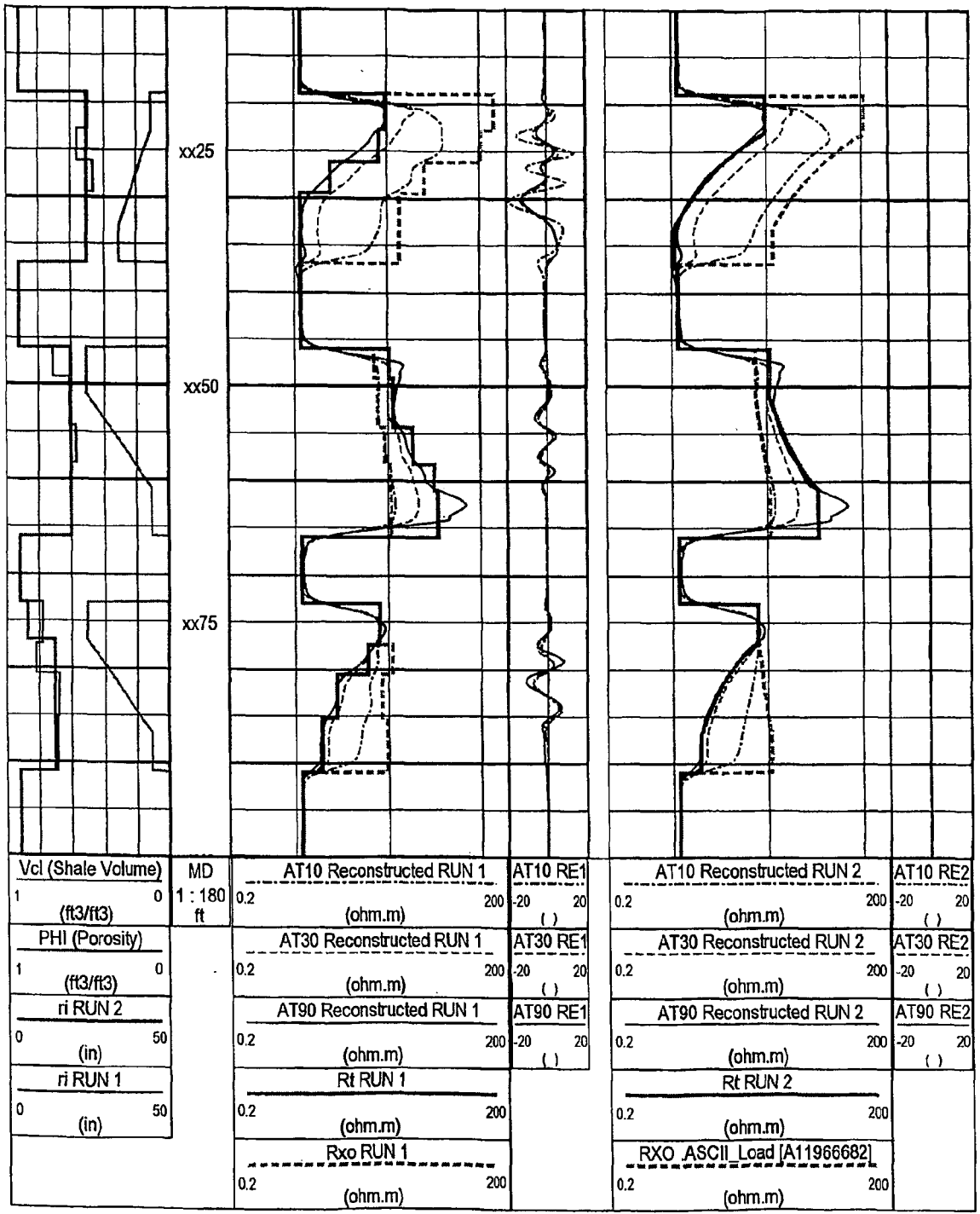
FIG. 6 shows log plots of complex model interpretations.

FIG. 6 presents the results of an analysis using complex models with transition zones. The upper section is made of three beds with changing porosity (from 0.1 to 0.3 P.U.), the middle and lower sections shows beds with variations of shale fractional volume (from 0.1 to 0.5). In the middle (resp. lower) section, the free (resp. total) water saturation of each bed is assumed constant. For this example, AIT-B* tool data have been modeled with $R_m=1$ ohm.m and $D_h=8.5$".

In an analysis without additional petrophysical input, the the different logs are squared to form a squared formation model. A ramp will be approximated by a staircase profile, causing a couple of important difficulties: (1) A significant number of additional parameters have to be determined, with the risk of having several equivalent solutions or even an unstable inversion, (2) Too coarse segmentation (with respect to the tool resolution and the vertical resistivity gradient) will not allow accurate reconstruction of the measurements, creating artifacts (oscillations) in the reconstruction errors. This can be seen on FIG. 6 (left logarithmic track RUN 1).

Correct analysis of the origin of the resistivity variation, resulting in the correct petrophysical model in the inversion scheme will allow better representation of the data, with fewer parameters and increased confidence (right logarithmic track RUN 2).

The invention claimed is:

1. A method for evaluating the properties of an underground formation surrounding a borehole, said formation including a series of distributed beds, each bed having specific properties, comprising;
   (i) measuring electrical properties of the formation from within the borehole;
   (ii) deriving a model of parameters of the formation surrounding the borehole;
   (iii) estimating the properties of the formation using the model to interpret the measured electrical properties;
   (iv) grouping similar beds;
   (v) assigning one or more properties to all of the beds in a group; and
   (vi) using the assigned properties to estimate the properties of the formation for measurements relating to the beds of that group.

2. A method as claimed in claim 1, wherein the method comprising estimating the positions of the beds, simulating measurements of the electrical properties using the estimated bed positions, comparing the simulated measurements to the measured electrical properties, and using the comparison to optimise the bed positions and estimate the formation properties from the measured electrical properties.

3. A method as claimed in claim 2, further comprising:
  (a) determining the variation of the measured electrical properties across the series of beds;
  (b) analysing the measured properties to obtain a first estimate of the position of each bed in the series;
  (c) simulating the variation of the measured electrical properties across the series using the model, the specific bed properties and the first estimated positions of the beds;
  (d) comparing the simulated variation of electrical properties with the determined variation of measured electrical properties;
  (e) using the comparison to adapt the estimate of the position of the beds such that the estimated variation and the determined variation are substantially the same; and
  (f) using the adapted estimate of the bed positions in the estimation of the formation properties.

4. A method as claimed in claim 2, wherein the bed position estimated is the bed boundary position.

5. A method as claimed in claim 1, further comprising:
  (a) identifying sequences of beds that are below the resolution of the electrical measurement;
  (b) assigning one or more properties to the beds in those sequences; and
  (c) using the assigned properties to estimate the properties of the formation including those sequences.

6. A method as claimed in claim 1, further comprising making several different measurements of formation electrical properties and simultaneously estimating the formation properties from the different measurements to provide a joint inversion.

7. A method as claimed in claim 6, further comprising;
  (a) obtaining several measurements of electrical properties of a formation of interest, each measurement being of a different nature;
  (b) simultaneously estimating the formation properties using the model and the different measurements of electrical properties.

8. A method as claimed in claim 3, wherein the bed position estimated is the bed boundary position.

9. A method as claimed in claim 1, further comprising the use of a complex model incorporating electrical properties with other petrophysical information to estimate the properties of the formation from the electrical measurements.

* * * * *